United States Patent [19]

Clinton

[11] Patent Number: 4,771,339

[45] Date of Patent: Sep. 13, 1988

[54] METHOD OF RECORDING IMAGES

[75] Inventor: Geoffrey D. Clinton, Hertfordshire, England

[73] Assignee: Crossfield Electronics Limited, London, England

[21] Appl. No.: 4,446

[22] Filed: Jan. 20, 1987

[30] Foreign Application Priority Data

Jan. 20, 1986 [GB] United Kingdom ............... 8601300

[51] Int. Cl.$^4$ ............................................. H04N 1/21
[52] U.S. Cl. ..................................... 358/296; 493/55
[58] Field of Search ........................... 493/52, 53, 55; 358/296, 298, 299, 302, 300

[56] References Cited

U.S. PATENT DOCUMENTS

| 3,639,056 | 2/1972 | Gerson ................................... 355/40 |
| 4,675,833 | 6/1987 | Cheek et al. ........................ 364/523 |

FOREIGN PATENT DOCUMENTS

| 1900881 | 7/1970 | Fed. Rep. of Germany . |
| 1652340 | 4/1971 | Fed. Rep. of Germany . |
| 3230719 | 3/1983 | Fed. Rep. of Germany . |
| 2066507 | 7/1981 | United Kingdom . |

OTHER PUBLICATIONS

Colditz, Von Armin, "Prinzip und Leistungsmerkmale der digital-elektronischen Lichtsetz systems DIGI-SET, *Siemens Zeitschrift* 47, 1973, Heft 10, pp. 741-746.
Takigawa, Tadahiro et al., "High Voltage Electron Beam Lithography", Microelectronic Engineering J, 1983, pp. 121-142.

*Primary Examiner*—Clifford C. Shaw
*Attorney, Agent, or Firm*—Sughrue, Mion, Zinn, Macpeak and Seas

[57] ABSTRACT

A method of recording an image on a record medium in which the image comprises a number of interleaved first patterns (FIG. 1A) comprises deriving a second pattern (17) formed by a complete first pattern and portions of other first patterns whereby the image comprises a plurality of the second patterns in the same orientation and which are not interleaved, and causing relative movement between the record medium (32) and an exposing beam such that the beam scans the record medium and is repeatedly controlled to reproduce the second pattern and thus the image on the record medium.

5 Claims, 2 Drawing Sheets

METHOD OF RECORDING IMAGES

FIELD OF THE INVENTION

The invention relates to methods of recording an image on a record medium.

DESCRIPTION OF THE PRIOR ART

In conventional image reproduction systems, relative movement is caused between a record medium and an exposing beam or set of exposing beams such that the exposing beams scan across the record medium. The exposing beams are controlled in response to image information to record an image on the record medium. In a half-tone imaging system, the image will be recorded in the form of half-tone dots of different area depending upon the density of a colour component. Typically, such a system is computer controlled and includes a two dimensional store whose elements define a dot cell, the computer generating beam control signals in response to image information and half-tone information from the store.

The record medium may comprise a printing member such as a gravure cylinder or one or more radiation sensitive films which are used subsequently to prepare printing members.

In some applications, for example the printing of carton blanks, the same basic pattern is printed on different parts of a substrate but with parts of adjacent patterns laterally interleaved. In other words parts of different patterns can be crossed by a single scan line. This pattern is stored in digital form in one (monochrome) or more (coloured) arrays of pixel colour component data. This causes a problem when preparing the record medium since complex computer processing is required when the scanning direction of the exposing beam relative to the record medium is such that the pattern information cannot be accessed simply by repeatedly scanning the stored data in the same manner. There are various possible ways to deal with this problem. For example, additional stores could be set up with different parts of the pattern or additional intermediate stores could be provided in which information is temporarily stored after having been read from the main store to enable information to be read out in a different manner. These possible solutions both involve extra expense and increase the time for recording the image.

SUMMARY OF THE INVENTION

In accordance with the present invention, a method of recording an image on a record medium in which the image comprises a number of laterally interleaved first patterns comprises (1) deriving a second pattern formed by a plurality of the first patterns and/or portions of the first patterns whereby the image comprises a plurality of lines of the second patterns in the same orientation and which are not laterally interleaved; and, (2) causing relative movement between the record medium and an exposing beam or beams whereby the exposing beam(s) scans the record medium and is repeatedly controlled to reproduce the second pattern on the record medium such that the image is recorded on the record medium.

We have recognised that due to the repetitive nature of the final image it is possible to derive from the resulting image a second pattern formed by a plurality of the first patterns and/or portions of the first patterns which is repeated throughout the record medium in the same orientation. The advantage of this is that only the second pattern needs to be stored and repeatedly accessed by repeatedly scanning in the same series of scan lines without any changes in the order of access of data from the store being required.

In the case of colour printing, the "image" referred to may comprise a colour separation so that in this case the method will be repeated with a plurality of record media and corresponding images, one for each colour component.

The record medium may comprise a printing member such as a gravure cylinder or a radiation sensitive film.

Step (1) of the method is most conveniently achieved by manual inspection of the image on for example a monitor. The second pattern can then be defined by an operator using conventional image modifying techniques.

The invention is particularly applicable to a method of preparing a set of printed substrates, this method comprising preparing at least one printing member by using, at least as an intermediate step, a method according to the invention; printing a composite substrate with the or each printing member; and dividing the composite substrate into a set of identical subsidiary substrates, whereby each subsidiary substrate is printed with the image.

The dividing step may comprise cutting the composite substrate or, where the substrate has previously been perforated, simply tearing the composite substrate along the perforations.

It will be appreciated that this method is particularly suitable for the preparation of sets of printed carton blanks which can subsequently be folded into cartons.

BRIEF DESCRIPTION OF THE DRAWINGS

An example of a method according to the invention and apparatus for carrying out the method will now be described with reference to the accompanying drawings, in which.

DETAILED DESCRIPTION OF AN EMBODIMENT

The method will now be described in connection with the printing of carton blanks. A typical carton blank has a base and four side walls and optionally a lid. For simplicity, the invention will be described with reference to cartons without lids. If such a carton blank is laid flat it will have a '+' form.

Figure 2:
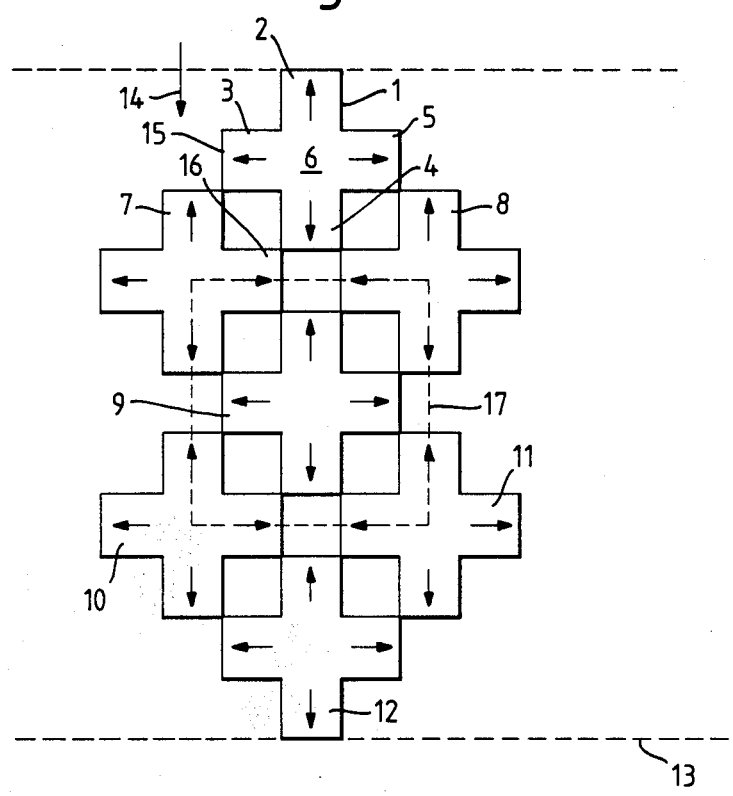
FIG. 2 illustrates the appearance of part of a printed substrate.

It is desirable to be able to print a large number of carton blanks on a single composite substrate such as cardboard and to this end in order to minimise wastage, the carton blanks could be laid out as shown in FIG. 2. This illustrates seven carton blanks labelled 1 and 7–12 laid out on a cardboard sheet 13. This arrangement is then repeated over the full substrate or sheet. As can be seen, adjacent blanks are interleaved with one another.

Figure 1A:
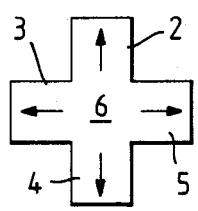
FIG. 1A illustrates a basic pattern and FIG. 1B a portion of that pattern.
Figure 1B:

The outer surface of each side 2–5 of the carton will be printed with a first pattern which in this example has the form shown in FIG. 1A made up from a pattern portion (FIG. 1B) in four different orientations. This pattern portion has a very simple form for the purposes of this description. It will be appreciated that once the sides of the carton have been folded up about the base 6 each pattern portion will be in the same orientation on each side (i.e. arrow facing upwards). However, when the carton blank is laid flat the appearance will be as shown at 1 in FIG. 2.

In a typical scanning system such as our "Lasergravure" system, a gravure cylinder rotates at a relatively high speed while one or more laser beams move at a relatively slow speed parallel with the axis of the cylinder. The laser beams impinge on the cylinder and are controlled by image information selectively to etch the surface of the cylinder. Typically, the scanning direction of the laser beam or beams across the cylinder is as indicated by an arrow 14 in FIG. 2.

It will be seen in FIG. 2 that several single scans in the direction 14 will pass through areas in which portions from different first patterns are successively imaged. This means that where a transition occurs from one first pattern to another (e.g. from pattern portion 15 to pattern portion 16) further processing must be carried out to ensure that beam control data from the first pattern store is accessed in the correct sequence so that the laser beams correctly expose the gravure cylinder. This adds to the processing time and is undesirable.

We have realised that despite the lateral interleaving of the first patterns in FIG. 2 relative to the scanning direction, there is a second larger pattern which is repeated in the same orientation throughout and which is not interleaved. This second pattern is defined by a dashed line 17 in FIG. 2 and is shown in more detail in FIG. 3. It will be seen that this second pattern, shown in FIG. 3, includes portions of the first pattern around its edge and surrounds a complete first pattern.

Figure 3:
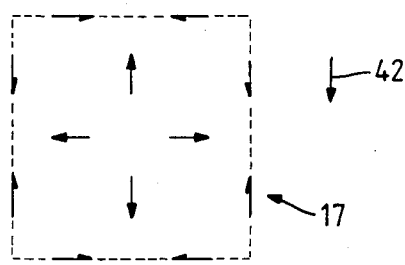
FIG. 3 illustrates the second, repeated pattern derived from consideration of the resultant image illustrated in FIG. 2; and, FIG. 4A and 4B illustrate an example of apparatus for preparing a printing member.

Thus, instead of storing the first pattern the pattern shown in FIG. 3 is stored and accessed by a computer which controls the laser beam or laser beams when exposing the gravure cylinder.

Figure 4B:
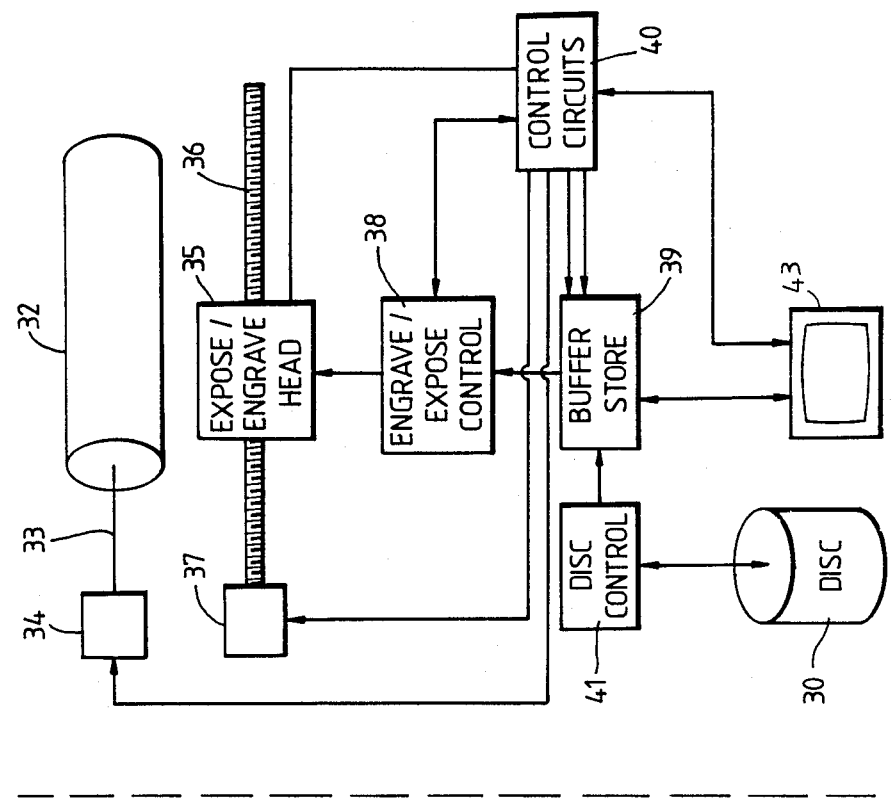
Figure 4A:
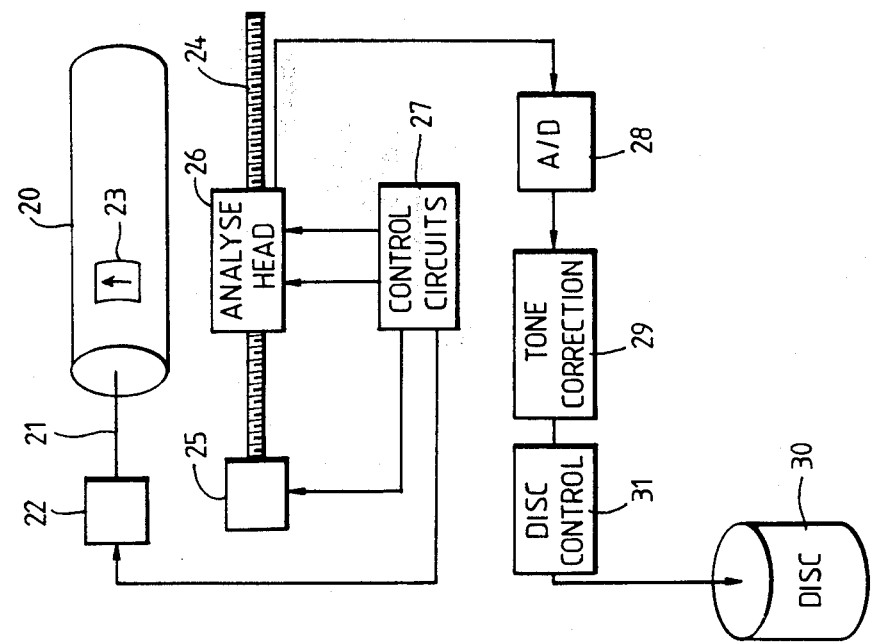

An example of apparatus for producing a printing member using a second pattern generated in accordance with the above description is shown in FIGS. 4A and 4B. The apparatus comprises an input scanner (FIG. 4A) and an output system (FIG. 4B). The input scanner comprises a rotatably mounted cylinder 20 coupled via a shaft 21 with a motor 22. The cylinder 20 carries a representation (such as a transparency) 23 of the pattern portion shown in FIG. 1B. The cylinder 20 is positioned adjacent a lead screw 24 carrying an analyse head 26 of conventional form. The lead screw 24 is coupled with a motor 25. In use, the cylinder 20 is rotated by the motor 22 at relatively high speed while the lead screw 24 is rotated at a much lower speed by the motor 25 to cause the analyse head 26 to move parallel with the cylinder 20 and to scan the representation 23, which is illuminated by means not shown positioned within the cylinder 20. The motors 22, 25 and analyse head 26 are controlled by circuits 27.

The analyse head generates digital signals the density of each pixel of the representation 23. These digital signals represent for example the cyan, magenta and yellow colour densities of each pixel if the original is a transparency or the monochrome density of each pixel if the original is a separation. The signals are fed via an analogue-to-digital converter 28 to a tone correction circuit 29 and then stored digitally in a first pattern store 30 in the form required for the desired first pattern as shown in FIG. 1A. The store 30 is a disc store controlled by a disc control 31. Thus, in this example, four representations of the pattern portion 23 will be stored in the two dimensional store 30 with the pattern portion in four different orientations.

Once scanning is complete, the disc store 30 is transferred to the output system (FIG. 4B). This can be either a conventional expose scanner with some additional electronics or an engraver such as a modified form of our Lasergravure.

The output system comprises a gravure cylinder 32 (or alternatively a cylinder on which an output recording film is mounted) coupled via a drive shaft 33 with a motor 34. An expose or engrave head 35 containing one or more laser sources is mounted on a lead screw 36 for movement alongside the cylinder 32. The lead screw 36 is rotated by a motor 37.

The head 35 is controlled by engrave/expose control circuits 38 coupled with a buffer store 39 and control circuits 40.

The contents of the disc store 30 defining individual colour separations are down-loaded via the disc control 41 to the buffer store 39 where they are assembled by the control circuits 40 into the final output pattern (FIG. 2). From this an operator making use of a monitor 43 can define the "second" pattern (FIG. 3) which is to be repeated. This is stored in the buffer store 39.

During exposure of the cylinder 32, the cylinder is rotated at a relatively high speed by the motor 34 while the lead screw 36 is rotated at a much lower speed by the motor 37 so that the expose head 35 scans the cylinder 32. During the scanning process, the condition of the or each laser beam generated within the expose head 35 is controlled by the circuits 38. The control circuits 38 effectively repeatedly scan the contents of the buffer store 39 defining the second pattern in the direction of the arrow 42 in FIG. 3 in synchronism with the scanning of the cylinder 32. The exposure of the cylinder 32 is controlled in a conventional manner in response to the digital data accessed from the store 39 and half-tone data so that the second pattern in the store 39 is repeatedly reproduced on the cylinder 32 in half-tone dot form.

It should be appreciated that many different forms of suitable apparatus may be devised and in particular the input scanning apparatus may be physically separate from the gravure apparatus (as shown) or joined with it.

One or more gravure cylinders may be prepared in this way depending on the type of pattern i.e. coloured or black and white. Then the gravure cylinder(s) are used to print a substrate such as cardboard with the image as shown in FIG. 2. The cardboard substrate is then cut along the solid lines shown in FIG. 2 to produce the carton blanks. It should be understood that the solid lines shown in FIG. 2 are purely for ease of understanding the drawing and are not printed in practice.

I claim:

1. A method of recording a composite image on a record medium, comprising the steps of:
   (a) laterally interleaving a plurality of identical first patterns, each defining a plurality of differently oriented individual images,
   (b) deriving a second pattern formed by at least one complete first pattern and portions of other ones of said first patterns, said composite image comprising a plurality of said second patterns in the same orientation and which are not laterally interleaved; and (c) causing relative movement between said record medium and at least one exposing beam such that said at least one exposing beam scans said record medium and is repeatedly controlled to reproduce said second pattern on said record medium such that said composite image is recorded on said record medium.

2. A method according to claim 1, wherein said record medium comprises a gravure cylinder.

3. A method of preparing a set of printed substrates, the method comprising preparing at least one printing member by using a method according to claim 1; printing a composite substrate with said at least one printing member; and dividing said composite substrate into a set of identical subsidiary substrates, whereby each said subsidiary substrate is printed with said first pattern.

4. A method according to claim 3, wherein said dividing step comprises cutting said composite substrate to separate therefrom the identical subsidiary substrates.

5. A method according to claim 3 or claim 4, wherein said substrate comprises cardboard.

* * * * *